(12) United States Patent
Flores, Jr. et al.

(10) Patent No.: US 6,702,110 B1
(45) Date of Patent: Mar. 9, 2004

(54) DISC STORAGE CONTAINER

(75) Inventors: Victorio T. Flores, Jr., Rancho Palos Verdes, CA (US); Victorio M. Flores, III, San Pedro, CA (US); Ernst C. Benjamins, Covina, CA (US)

(73) Assignee: Ace Packaging, Inc., Lake Forest, CA (US)

( * ) Notice: Subject to any disclaimer, the term of this patent is extended or adjusted under 35 U.S.C. 154(b) by 0 days.

(21) Appl. No.: 09/706,213

(22) Filed: Nov. 2, 2000

Related U.S. Application Data (63) Continuation-in-part of application No. 09/573,867, filed on May 18, 2000.

(51) Int. Cl.$^7$ ............................................. B65D 85/57
(52) U.S. Cl. ................................. 206/310; 211/40
(58) Field of Search ........................ 206/308.1, 308.2, 206/309, 310, 312; 211/40, 85.2

(56) References Cited

U.S. PATENT DOCUMENTS

| | | | |
|---|---|---|---|
| 3,949,872 A | 4/1976 | Paudras | 206/310 |
| 4,685,277 A | 8/1987 | Ilsemann | 53/474 |
| 4,722,439 A | 2/1988 | Grobecker et al. | 206/309 |
| 4,747,484 A | 5/1988 | Ackeret | 206/387 |
| 4,771,883 A | 9/1988 | Herr et al. | 206/313 |
| 4,771,890 A | 9/1988 | Hofland et al. | 206/445 |
| 4,899,875 A | 2/1990 | Herr et al. | 206/313 |
| 4,903,829 A * | 2/1990 | Clemens | 206/310 |
| 4,964,510 A | 10/1990 | Loyd | 206/306 |
| 5,205,401 A | 4/1993 | Weisburn et al. | 206/1.5 |
| 5,211,283 A | 5/1993 | Weisburn et al. | 206/1.5 |
| 5,259,498 A | 11/1993 | Weisburn et al. | 206/45.15 |
| 5,279,097 A | 1/1994 | Weisburn et al. | 53/449 |
| 5,284,243 A | 2/1994 | Gelardi et al. | 206/310 |
| 5,390,515 A | 2/1995 | Essick | 70/63 |
| 5,445,265 A | 8/1995 | Herr et al. | 206/308.1 |
| D369,712 S | 5/1996 | Sankey et al. | D6/629 |
| 5,533,615 A | 7/1996 | McCamy | 206/308.1 |
| 5,551,560 A | 9/1996 | Weisburn et al. | 206/310 |
| 5,573,120 A | 11/1996 | Kaufman et al. | 206/755 |
| 5,574,716 A | 11/1996 | Uchida | 369/291 |
| 5,584,391 A | 12/1996 | Weisburn | |
| 5,590,768 A | 1/1997 | Hilton et al. | 206/308.1 |
| 5,597,068 A | 1/1997 | Weisburn et al. | 206/308.1 |
| 5,615,779 A | 4/1997 | Marsilio et al. | 211/40 |
| 5,682,991 A | 11/1997 | Lammerant et al. | 206/308.1 |
| 5,690,218 A | 11/1997 | McCamy et al. | 206/303 |
| D387,217 S | 12/1997 | Lakoski et al. | D6/407 |
| 5,713,463 A | 2/1998 | Lakoski et al. | 206/308.1 |
| 5,762,187 A | 6/1998 | Belden, Jr. et al. | 206/308.2 |
| 5,779,038 A | 7/1998 | Herr et al. | 206/308.2 |
| 5,782,350 A | 7/1998 | Weisburn et al. | 206/308.2 |
| 5,788,068 A | 8/1998 | Fraser et al. | 206/310 |
| 5,794,796 A | 8/1998 | Weisburn | 211/40 |
| 5,816,394 A | 10/1998 | O'Brien et al. | 206/308.1 |
| 5,829,582 A | 11/1998 | Ippolito et al. | 206/308.1 |
| 5,829,583 A | 11/1998 | VerWeyst et al. | 206/308.1 |
| 5,842,563 A | 12/1998 | Herr et al. | 206/308.1 |
| 5,938,020 A | 8/1999 | Luckow | 206/308.1 |
| 6,155,417 A | 12/2000 | Flores, Jr. et al. | 206/308.1 |
| 6,164,446 A | 12/2000 | Law | 206/308.1 |
| 6,364,107 B1 | 4/2002 | Flores, Jr. et al. | |
| 6,454,090 B1 * | 9/2002 | Flores, Jr. et al. | 206/308.1 |

FOREIGN PATENT DOCUMENTS

| | | |
|---|---|---|
| WO | WO96/14636 | 5/1996 |
| WO | WO97/41563 | 11/1997 |

* cited by examiner

*Primary Examiner*—John G. Weiss
*Assistant Examiner*—Michael J. Fisher (57) ABSTRACT

A storage container for storing optical discs, the storage container having a support ring that defines a disc storage area and a plurality of holding members that securely retain a disc in the disc storage area, each holding member having a base connected to the disc storage area and a disc supporting wall having a retaining lip that limits the movement of the disc when the disc is placed in the disc storage area. The holding member being flexible so as to facilitate the insertion and removal of a disc from the disc storage area. In another embodiment of the invention, the storage container further includes a pair of release buttons placed diametrically opposed to one another to facilitate the removal of a disc from the disc container.

23 Claims, 6 Drawing Sheets

DISC STORAGE CONTAINER

CROSS-REFERENCE TO RELATED APPLICATION

This application is a continuation-in-part of pending application Ser. No. 09/573,867, filed May 18, 2000, and entitled DISC STORAGE CONTAINER, the entire contents of which is hereby expressly incorporated by reference as if set forth herein in full.

FIELD OF THE INVENTION

The present invention relates generally to disc storage containers and more particularly to a disc storage container which is configured to store an optical disc such as a CD, CD-ROM, CD-R, CD-RW, DVD, DVD-R, DVD-RAM or the like.

BACKGROUND OF THE INVENTION

Optical discs such as CDs, CD-ROMs, CD-Rs, CD-RWs, DVDs, DVD-Rs, DVD-RAMs and the like are well known. Such discs are commonly stored within a protective container. The protective container prevents the disc from being scratched or otherwise damaged during shipping, handling and storage thereof.

As those skilled in the art will appreciate, discs are subject to being damaged by mishandling thereof. Although the bottom surface of such discs comprises a layer of polycarbonate or the like which has a thickness of approximately 0.050 inch (and which is thus comparatively durable and resistant to physical damage), the top surface of such discs comprises an extremely delicate aluminum film which typically has a thickness of only approximately 1 micron.

The delicate aluminum surface on the top of contemporary discs is therefore undesirably susceptible to physical damage. Scratching or other damage to this thin aluminum film often results in damage to the data, e.g., computer program, computer data, audio data, video data or the like stored upon the disc. Although data is typically stored upon such optical discs in a manner which readily facilitates recovery of lost portions thereof due to such physical damage to the media, it is still possible to damage the aluminum film in a manner such that data is permanently lost. It is even possible to damage the disc sufficiently that it becomes completely unusable. Thus, protective storage containers are frequently utilized to facilitate shipping, handling and storage of such optical discs. The storage containers protect the discs from physical damage which might otherwise occur.

Although such contemporary storage containers for discs and the like have proven generally suitable for their intended use, contemporary storage containers suffer from inherent deficiencies which detract from their overall effectiveness and desirability. For example, contemporary storage containers are loaded with a disc, either initially at the factory or by a user, by pushing the disc downwardly into the container to force the central opening of the disc over a hub. Further, contemporary storage containers require that a disc be removed therefrom by pulling the disc upwardly at the periphery thereof, while pushing downwardly upon the hub of the storage container, so as to free the disc from the hub. Such pulling up at the periphery of the disc causes the disc to deform or bend substantially, thereby introducing substantial stresses into the disc.

The introduction of such stresses is particularly undesirable for multi-layer optical discs, such as those used in the production of high density DVDs and the like. Multi-layer discs are rapidly becoming popular because of the ability to store large amounts of data, such as video programming thereon.

As those skilled in the art will appreciate, the introduction of such undesirable stresses into multi-layer discs may cause the plural layers of the disc to delaminate as the shear strength of the bonding agent used to attach adjacent layers to one another is exceeded. Such delamination will, of course, result in the destruction of the disc, rendering it completely useless.

Thus, it is desirable to provide a storage container which is configured to store an optical disc, such as a CD, CD-ROM, CD-R, CD-RW, DVD, DVD-R, DVD-RAM or the like, which mitigates the undesirable introduction of stresses into the optical disc when it is placed within the storage container (both during an initial machine placement of the disc within the storage container and during subsequent user placement of the optical disc therein) and when the disc is removed from the storage container.

It is further desirable that the storage container facilitate automated or machine based manufacturing techniques, wherein a machine arm, pusher or the like is used to place an optical disc within the storage container in a rapid and efficient manner. Such automated loading of a disc storage container should be performed without introducing substantial undesirable stresses to the disc. Further, it is desirable to provide a disc storage container which facilitates self-centering for both automated loading thereof and for loading thereof by a user, so as to further mitigate undesirable stresses being imparted to the disc and so as to make loading easier and more convenient.

Another disadvantage commonly associated with contemporary disc storage containers is that of their inability to adequately deter theft therefrom. It is well known that a disc may be removed from a contemporary disc storage container by merely slitting the outer cellophane wrapping thereof and then popping the disc loose from its retainer within the housing of the disc storage container so that the disc can be removed through the slit in the cellophane wrapper. Thieves generally prefer to remove such discs from their disc storage containers, since anti-theft devices are typically attached to the disc storage containers, and not the discs themselves.

For example, a small knife or other sharp object may be used to slit one end of the cellophane wrapper of a housing sufficiently to allow a disc to be removed therefrom. Then the housing is deformed or bent, such as by pressing in the middle thereof and pulling out the ends thereof, so as to disengage a disc contained therein from the hub. The loose disc may then be manipulated toward the opening which was slit in the cellophane wrapper, so as to facilitate removal of the disc from the housing.

In view of the foregoing, it is further desirable to provide a housing which mitigates the ability of a thief to steal a disc by disengaging the disc from the housing, in the above-described manner.

SUMMARY OF THE INVENTION

The present invention specifically addresses and alleviates the above-mentioned deficiencies associated with the prior art. More particularly, the present invention comprises a disc storage container for storing at least one CD, CD-ROM, CD-R, CD-RW, DVD, DVD-R, DVD-RAM or the like. The disc storage container comprises a housing having a cover, a base, and a living hinge member interconnecting the cover and the base via two living hinges. A raised portion of the base defines a recess which is configured to receive at least one disc. The recess has a floor and a raised portion.

According to an alternative configuration of the present invention, a tray is defined by the base. In integral cover is not provided for the tray, but rather one or more such trays (which are optionally attached to one another or formed integrally with one another) are inserted into a separate box.

Optionally, the raised portion comprises a taper formed substantially around the floor of the recess. The taper is configured to facilitate self-centering of a disc as the disc is being inserted into the recess. Such self-centering mitigates stress on the disc during both initial machine insertion thereof and during later insertion of the disc by a user.

Optionally, the raised portion further comprises a top wall configured to inhibit movement of a disc radially out of the recess, a bottom wall configured to inhibit movement of the disc radially out of the recess, a right wall configured to inhibit movement of a disc radially out of the recess, and a left wall configured to inhibit movement of a disc radially out of the recess.

Optionally, a first depression formed in the raised portion intermediate the top wall and the right wall is configured to facilitate grasping of a disc disposed within the recess and a second depression formed in the raised portion intermediate the right wall and the bottom wall is similarly configured to facilitate grasping of a disc disposed within the recess.

Optionally, a cover stop is formed to the cover and is configured to inhibit removal of the disc from the recess when the cover is closed. Optionally, a hinge member stop is formed to the hinge member and is also configured to inhibit removal of the disc from the recess when the cover is closed. Thus, according to one configuration of the present invention, two different stops, i.e., the cover stop and the hinge member stop, are used to maintain the disc within the recess in a manner which inhibits theft of the disc from the disc storage container by slipping the cellophane and then popping the disc out of the recess. The two stops inhibit movement of the disc out of the recess when an attempt is made to pop it therefrom by bending the housing, as described above.

Preferably, the present invention comprises first and second latches, either of which may be utilized to facilitate removal of a disc from the recess. For example, a first latch is disposed proximate the top wall. The first latch has an open position and a closed position, wherein removal of the disc from the recess is inhibited by the first latch when the first latch is in the closed position and wherein removal of the disc from the recess is facilitated by the first latch when the first latch is in the open position.

Similarly, the present invention further comprises a second latch disposed proximate the bottom wall, the second latch has an open position and a closed position, wherein removal of the disc from the recess is inhibited by the second latch when the second latch is in the closed position and wherein removal of the disc from the recess is facilitated by the second latch when the second latch is in the open position.

The use of two separate latches is advantageous in that a disc disposed within the recess is removable when only one of the first and second latches is in the open position, thus facilitating both right and left-handed operation of the present invention.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION OF THE INVENTION

The detailed description set forth below in connection with the appended drawings is intended as a description of exemplary embodiments of the invention and is not intended to represent the only form in which the present invention may be constructed or utilized. The detailed description sets forth the construction and functions of the invention, as well as the sequence of steps for operating the invention in connection with the illustrated embodiments. It is to be understood, however, that the same or equivalent functions may be accomplished by different embodiments which are also intended to be encompassed within the spirit and scope of the invention.

As used herein, the term disc is defined to include any compact disc (CD), compact disc read only memory (CD-ROM), recordable compact disc (CD-R), rewriteable compact disc (CD-RW), digital video disc or digital versatile disc (DVD), recordable digital video disc or digital versatile disc (DVD-R), digital video disc random access memory or digital virtual disc random access memory (DVD-RAM), as well as any other similar device which is used for storing information.

Referring now to FIGS. 1–11, one exemplary configuration disc storage container 10 comprises a housing 11 having a cover 12, a base 13 and a living hinge member 14. The living hinge member 14 interconnects the cover 12 and the base 13 with two living hinges, 16 and 17.

A raised portion 18 of the base 13 is configured to receive at least one disc, such that the lowermost disc received thereby rests upon a taper 21 defined by the raised portion 18. The lower most disc rests upon the taper 21 at the peripheral edge thereof, such that the portion of the bottom surface of the disc where information is stored is spaced apart from the floor 19 of the base 13, preferably by approximately 0.090 inch, so as to prevent undesirable contact of the bottom of the disc with the disc storage container of the present invention. In this manner, the likelihood of scratching, abrading or otherwise undesirably damaging the underside of the disc is substantially mitigated.

Further, by supporting the lowermost disc at the periphery thereof and thus providing some clearance between the bottom of the lowermost disc and the floor 19 of the base 13, sufficient room is provided for a user to easily insert a finger or thumb beneath the disc (between the disc and the floor 19 of the base 13) so as to allow the user to conveniently lift the disc from the recess 20, as described in detail below.

Preferably, the raised portion 18 comprises a taper 21 which generally surrounds the floor 19 and which defines a concave, generally conical, surface which facilitates self-centering of a disc, as the disc is being inserted into the recess 20.

The recess 20 is configured so as to receive and contain at least one disc. The recess is preferably configured so as to receive and contain from one to four discs. However, as those skilled in the art will appreciate, the recess may be configured so as to receive and contain any desired number of discs. Thus, for example, the recess may be configured so as to receive and contain one, two, three, four, five, six, or more discs.

The raised portion 18 further comprises a top wall 25, a bottom wall 26, a right wall 27 and a left wall 28.

Each of the top wall 25, bottom wall 26, right wall 27, and left wall 28 is configured to inhibit movement of a disc radially out of the recess 20. Thus, the top wall 25, bottom wall 26, right wall 27 and left wall 28 cooperate to maintain any disc(s) contained within the recess 20 therein during an attempt to steal the disc(s) by slitting the cellophane wrapper of the disc storage container 20 and then manipulating the disc storage container 10 so as to remove the disc(s) therefrom.

More particularly, an attempt to bend the disc storage container 10 so as to pop discs contained therein from a central hub is not likely to be successful. The disc storage container of the present invention does not have a central hub from which the discs can be popped or otherwise removed. Further, discs are maintained within the recess 19 of the disc storage container 10 of the present invention by the top 25, bottom 26, right 27, and left 28 walls, even when the disc storage container 10 of the present invention is deformed substantially. Therefore, it is extremely difficult, if not impossible, to remove a disc from the disc storage container of the present invention by slitting the wrapper thereof and then deforming the disc storage container in an attempt to move the disc from the recess and through the slit in the wrapper.

Optionally, a first depression 31 is formed in the raised portion 18 intermediate the top wall 25 and the right wall 27. Optionally, a second depression 32 is similarly formed in the raised portion 18 intermediate the right wall 27 and the bottom wall 26. Both depressions 31 and 32 are configured to facilitate grasping of a disc disposed within the recess 20. That is, both the first and second depressions, 31 and 32, are configured so as to allow a user to insert a thumb or finger underneath one or more disc(s) contained within the recess 20, so as to allow the user to easily lift the disc(s) from the recess 20.

According to a preferred configuration of the present invention, a cover stop 33 is formed to the cover 12 and is configured to inhibit removal of disc(s) from the recess 20 when the cover 12 is closed.

According to a preferred configuration of the present invention, a hinge member stop 34 is formed to the hinge member 14, so as to similarly inhibit removal of disc(s) from the recess 20 when the cover is closed. A notch 36 formed in the left wall 28 receives the hinge member stop 34 when the cover 12 is closed, such that the hinge member stop 34 extends over the top of any disc(s) disposed within the recess 20.

Thus, the cover stop 33 and the hinge member stop 34 cooperate to maintain any disc(s) contained within the recess 20 therein, in a manner which inhibits theft of the disc(s) by slitting the cellophane wrapper and manipulating the disc storage container 10, as described above.

Indeed, the top wall 25, bottom wall 26, right wall 27, left wall 28, cover stop 33 and hinge member stop 34, all cooperate with one another in a manner which substantially mitigates the likelihood of a thief being able to successfully manipulate the disc storage container 10 in a manner which frees any disc from the recess 20 and allows the freed disc to move between the base 13 and the cover 12, such that the disc can slip out of the disc storage container 10 and through a slit formed in the cellophane disposed thereabout.

The first latch 41 and a second latch 42 cooperate to keep the disc(s) in the recess 20 when the cover 12 is open (as well as when the cover is closed). The first latch 41 is disposed proximate the top wall 25. The first latch 41 has an open position and a closed position. Removal of the disc(s) from the recess 20 is inhibited by the first latch 41 when the first latch 41 is in the closed position and is facilitated by the first latch 41 when the first latch 41 is in the open position.

Similarly, the second latch 42 is disposed proximate the bottom wall 26. The second latch 42 also has an open position and a closed position. Removal of disc(s) from the recess 20 is inhibited by the second latch when the second latch is in the closed position and is facilitated by the second latch when the second latch is in the open position.

Disc(s) disposed within the recess 20 are removable when either one of the first latch and the second latch is in the open position. Thus, according to the present invention, both right and left-handed operation of the latches, 41 and 42, is facilitated. That is, a user may use either the user's right-hand or a left-hand to depress either the first latch or the second latch, in order to effect removal of disc(s) from the recess 20.

Figure 1:
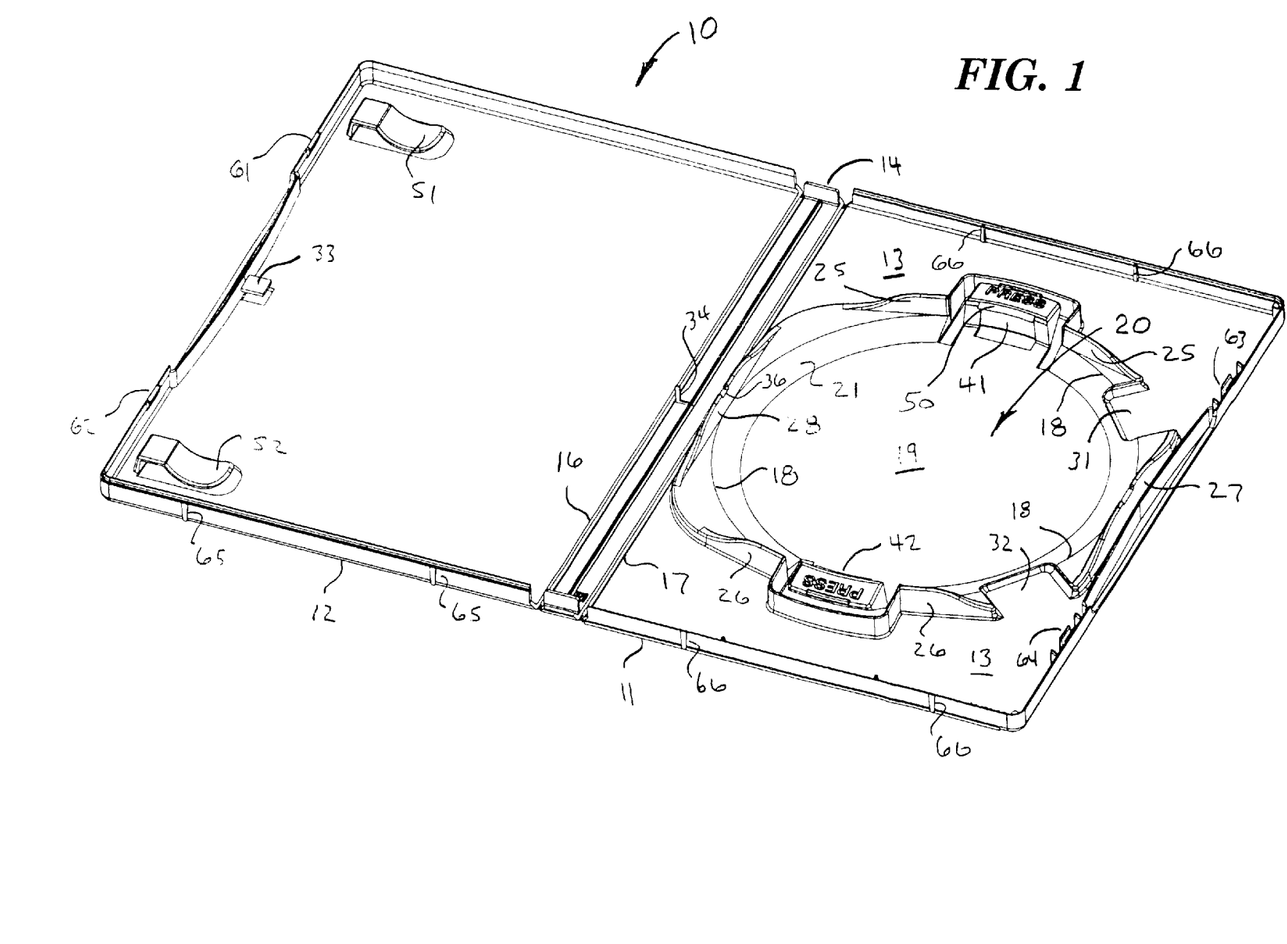
FIG. 1 is a semi-schematic perspective view of the disc storage container of the present invention.
Figure 2:
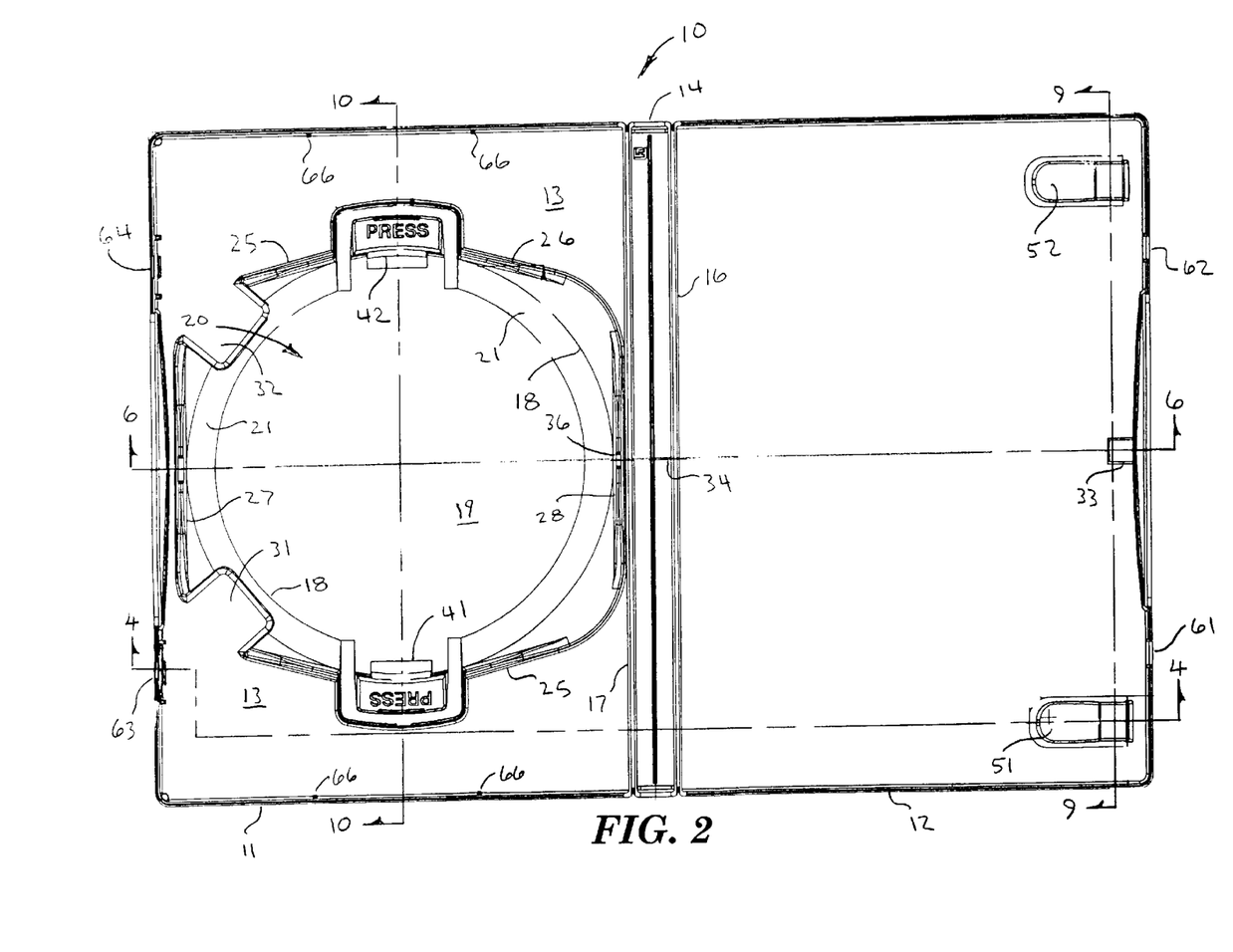
FIG. 2 is a semi-schematic top view of the disc storage container of FIG. 1.
Figure 3:
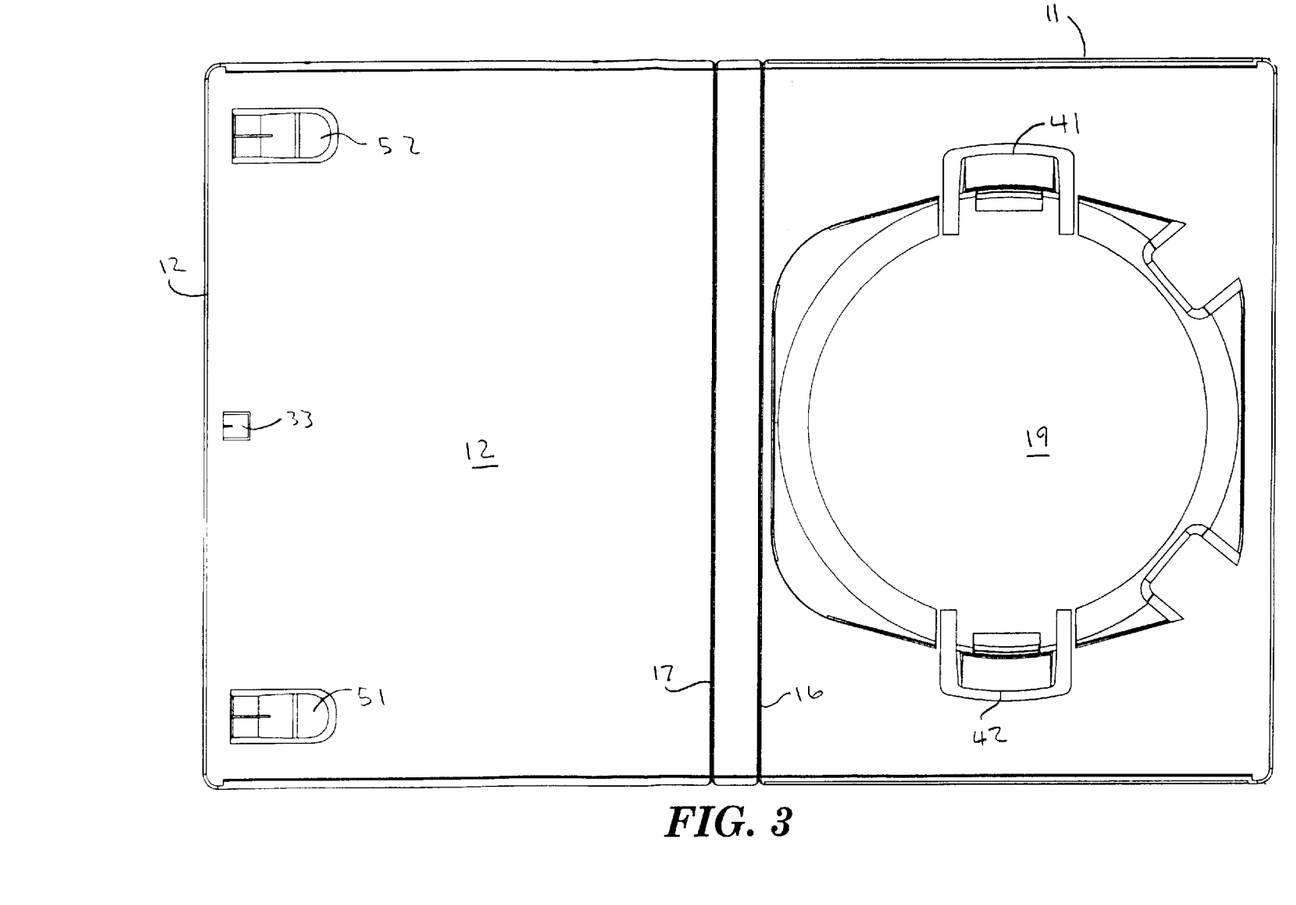
FIG. 3 is a semi-schematic bottom view of the disc storage container of FIG. 1.
Figure 4:
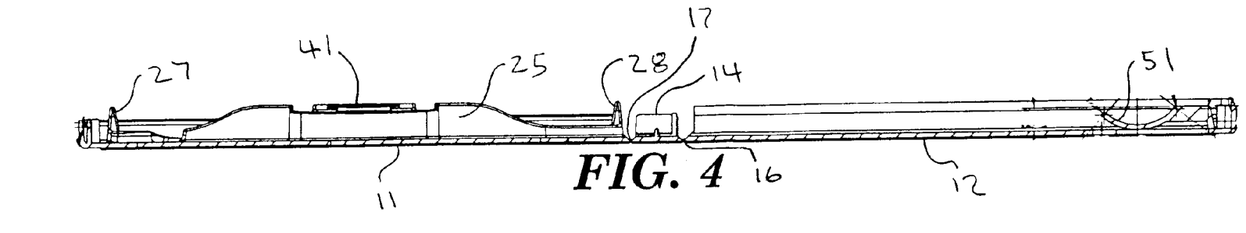
FIG. 4 is a semi-schematic cross-sectional view of the disc storage container of FIG. 2, taken along line 4 thereof.
Figure 5:
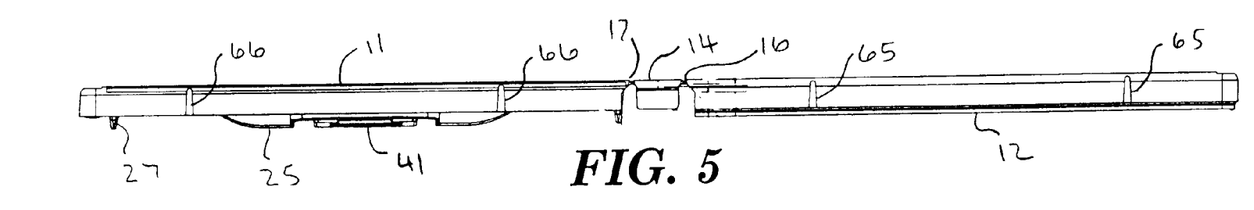
FIG. 5 is a semi-schematic end view of the disc storage container of FIG. 1, showing one end thereof, the other end thereof being substantially similar to the end shown.
Figure 6:
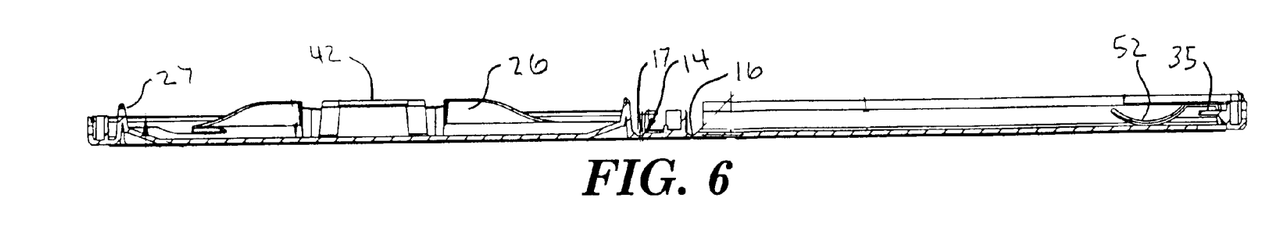
FIG. 6 is a semi-schematic cross-sectional view of the disc storage container of FIG. 2, taken along line 6 thereof.
Figure 7:
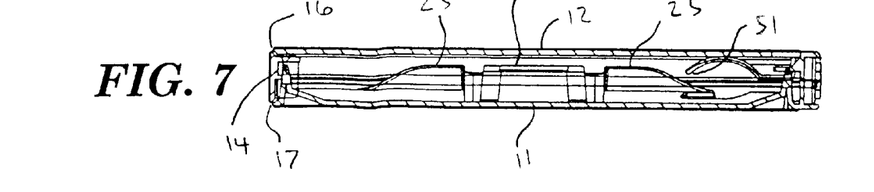
FIG. 7 is a semi-schematic cross-sectional end view of the disc storage container of the present invention in the closed position thereof.
Figure 8:
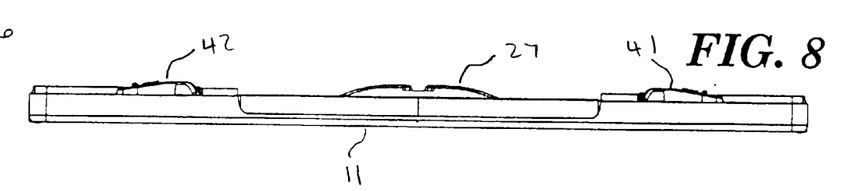
FIG. 8 is a semi-schematic side view of the disc storage container of FIG. 1.
Figure 9:
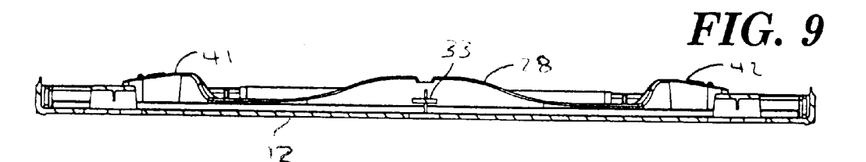
FIG. 9 is a semi-schematic cross-sectional view of the disc storage container of FIG. 2, taken along line 9 thereof.
Figure 10:
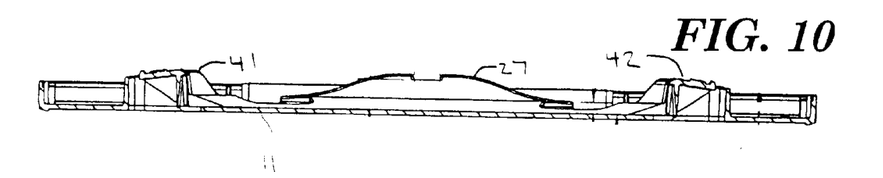
FIG. 10 is a semi-schematic cross-sectional view of the disc storage container of FIG. 2, taken along line 10 thereof.
Figure 11:
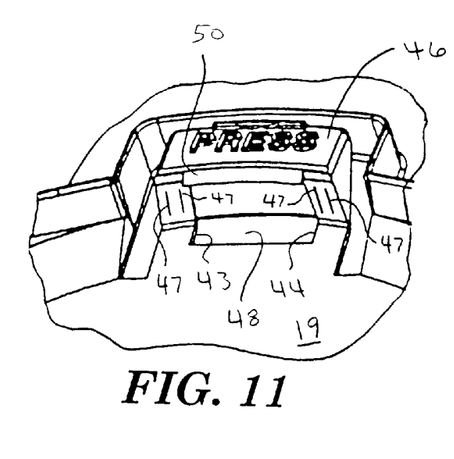
FIG. 11 is an enlarged semi-schematic perspective view of a latch of the disc storage container of FIG. 1.

With particular reference to FIG. 11, each latch, 41 and 42, preferably comprises a pair of flextures, 43 and 44. The flextures, 43 and 44, bend downwardly when the latch is depressed, so as to allow the latch to move downwardly and thus move the lip 50 of the latch outwardly (away from any discs stored in the recess 20), so as not to interfere with removal of one or more disc(s) from the recess 20.

Each latch, 43 and 44, further comprises a button 46, which preferably has the word PRESS formed thereon, so as to make clear the operation of the first and second latches.

Opening 48 reduces the amount of force required to bend the flextures 43 and 44, so as to allow the latches, 41 and 42, to be easily depressed or moved downwardly.

At least one, preferably a plurality of inwardly extending ribs 47 (FIG. 11) are preferably formed upon each latch. The ribs 47 are configured so as to contact the periphery of any disc(s) contained within the recess 20, so as to frictionally engage the disc(s) and thus inhibit rattling thereof, particularly in the instance that the recess 20 contains less than the total number of discs which may be disposed therein. For example, if the recess 20 is configured to contain a maximum of four discs and the recess 20 actually contains only one disc, then that disc would tend to be loose in the recess, such that the disc could move up and down or possibly rattle within the recess. The ribs 47 formed upon each latch, 41 and 42, frictionally engage the periphery of the disc so as to inhibit substantial vertical movement of the disc within the recess 20, and thereby inhibit the disc from rattling.

Those skilled in the art will appreciate that various different configurations of the opening 48 and/or the flextures 43 and 44 are likewise suitable. Indeed, in some instances it may be desirable to omit the opening 48 such that one large flexture is provided instead of the two smaller flextures shown in FIG. 11.

Clips, 51 and 52, hold a paper within the cover 12 of the disc storage container 10, as is done according to contemporary practice. Such papers typically comprise cover art for the disc and/or game instructions, advertising literature, song selections, movie scenes, etc. Preferably, the top wall 25, bottom wall 26, right wall 27, and left wall 28 each have a height such that when a paper is disposed in the cover 10 (and held thereby by clips, 51 and 52), then the top wall 25, bottom wall 26, right wall 27 and left wall 28 cooperate with the paper, so as to capture the disc(s) within the recess 20.

Alternatively, the first wall 25, second wall 26, right wall 27, and left wall 28 each have a height such that a disc cannot move radially out of the recess 20 between any of the walls, 25, 26, 27, and 28, and the cover 12, when the cover 12 is closed.

Cover detent members 61 and 62 are configured to cooperate with base detent members 63 and 64, so as to releasably latch the cover 12 in the closed position with respect to the base 13.

Ribs 65 enhance the strength of the cover 12 according to well known principles. Similarly, ribs 66 enhance the strength of the base 13 according to well known principles. The ribs 65 and 66, at least along one edge (preferably the lower edge) of the disc storage container 10 are preferably formed so as to facilitate stable standing of the disc storage container on end in a half or quarter open position (wherein the cover forms an angle of approximately 45° to 90° with respect to the base), in an open-book fashion. That is, the ribs 65 and 66 formed along the lower edge of the disc storage container 10 preferably define feet which provide a stable contact surface such that the disc storage container may be opened slightly and placed on end upon a table, counter, shelf of the like.

Although the disc storage container of the present invention is shown and described above as having both a base 13 and a cover 12, those skilled in the art will appreciate that a tray, which is substantially similar to the base 13, may alternatively be utilized without the associated cover 12. For example, a number of such trays may be formed in a book-like fashion (wherein another tray is substituted for the cover 12 shown in FIG. 1. Indeed, any desired number of such trays may be attached to one another, such as in a Z-fold fashion, so as to facilitate the storage of any desired number of discs. Those skilled in the art will appreciate the various different configurations of the present invention are contemplated herein.

Figure 12:
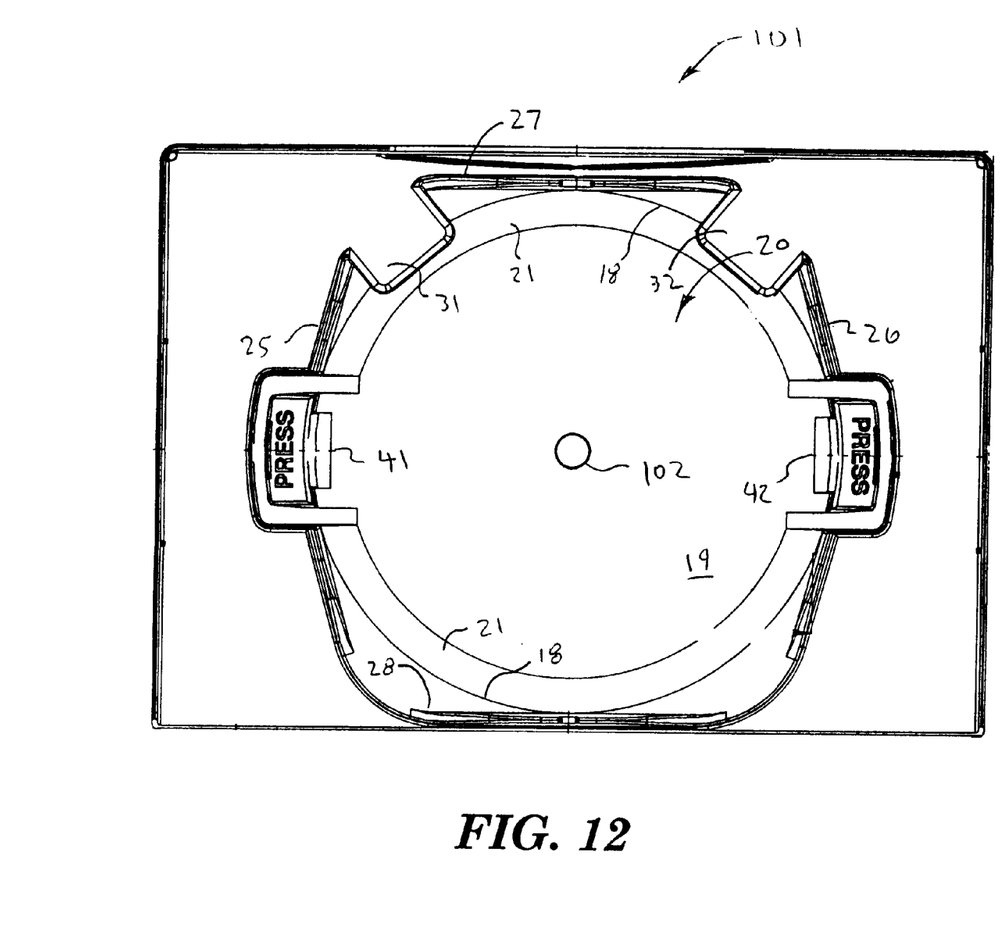
FIG. 12 is a semi-schematic top view of a tray for a disc storage container, according to the present invention.

According to the tray configuration of the present invention, a central post 102 extends upwardly from the floor 19 of the recess 20 to inhibit radial movement of disc(s) out of the recess 20. The central post 102 is received within a central opening of a disc and has a diameter which is substantially smaller than the diameter of the central opening of a disc. Therefor, the central post does not engage the disc, as does the hub of a contemporary disc storage container. When such a central post 102 is provided, then the walls 25, 26, 27 and 28 may optionally be provided, as well. The central post has a height similar to that of the walls and functions in a similar manner to retain the disc(s) within the recess and inhibit theft.

The latches, 41 and 42; depressions, 31 and 32; taper 21 and raised portion 18 of the tray 101 are substantially identical to those of FIGS. 1–11. Optionally, walls 25, 26, 27 and 28 are likewise provided for the tray, in a fashion similar to that shown in FIGS. 1–11. Thus, the central post 102, optionally in cooperates with the walls 25, 26, 27 and 28 inhibit movement of any disc(s) contained within the recess 20 in a radial direction, so as to similarly inhibit theft.

Having thus described the structure of the disc storage container of the present invention in detail, it may be beneficial to describe the operation and use thereof. One or more discs are initially loaded into the disc storage container 10 of the present invention utilizing a machine which lowers the discs, preferably one at a time, into the recess 20 of the base 13. Each disc is preferably supported about the periphery thereof as it is lowered passed the latches, 41 and 42. This process is repeated, as necessary, to either fill or partially fill the recess 20 with discs.

A user removes one or more discs from the recess 20 by simply depressing either one of the latches, 41 and 42, and then lifting the desired disc(s) from the recess 20. Because the lowermost disc is spaced apart from the floor 19 of the base 13, a user can simply insert a finger or thumb under the lowermost disc at one of the depressions, 31 or 32, so as to allow the user to conveniently lift the disc(s) from the recess 20.

Typically, a finger or thumb will be inserted into the depression, 31 or 32, which is closest to the latch, 41 or 42, which has been depressed. However, either depression 31 or 32, may be utilized with either latch, 41 or 42, as desired.

It is to be understood that the exemplary disc storage containers described herein and shown in the drawings represent only a presently preferred embodiments of the invention. Indeed, various modifications and additions may be made to such embodiment without departing from the spirit and scope of the invention. Thus, modifications and additions may be obvious to those skilled in the art and may be implemented to adapt the present invention for use in a variety of different applications.

What is claimed is:

1. A disc storage container comprising:
   a base;
   a raised portion of the base defining a recess which is configured to receive at least one disc;
   a first latch having an open position and a closed position and a push tab, wherein removal of the at least one disc from the recess is inhibited by the first latch when the first latch is in the closed position and wherein removal of the at least one disc from the recess is facilitated by the first latch when the first latch is in the open position;
   a second latch having an open position and a closed position and a push tab, wherein removal of the at least one disc from the recess is inhibited by the second latch when the second latch is in the closed position and wherein removal of the at least one disc from the recess is facilitated by the second latch when the second latch is in the open position; and
   wherein a disc disposed within the recess is removable when only one of the first latch or the second latch is in the open position, thus facilitating both right and left handed operation of the latches.

2. The disc storage container as recited in claim 1, wherein the base defines a tray.

3. The disc storage container as recited in claim 1, further comprising a cover and wherein a top wall, a bottom wall, a right wall and a left wall have a height which inhibits radial movement of the at least one disc out of the recess when the cover is closed.

4. The disc storage container as recited in claim 1, further comprising a cover and a hinge member interconnecting the cover and the base via two living hinges, the cover having an open position and a closed position with respect to the base.

5. The disc storage container as recited in claim 1, wherein the first latch and the second latch are configured to facilitate both right and left handed operation of one thereof.

6. The disc storage container as recited in claim 1, wherein the first and second latches are disposed at approximately diametrically opposed positions with respect to the recess.

7. The disc storage container as recited in claim 1 wherein the push tab of each of the first and second latches is configured to release a disc when pushed, the push tab comprising a generally planar tab and a lip, the lip inhibiting movement of the disc unless the planar tab is depressed.

8. The disc storage container as recited in claim 1, further comprising:
   a cover;
   a cover stop formed to the cover and configured to inhibit removal of the at least one disc from the recess when the cover is closed;
   a hinge member; and
   a hinge member stop formed to the hinge member and configured to inhibit removal of the at least one disc from the recess when the cover is closed.

9. The disc storage container as recited in claim 1, wherein the raised portion comprises:
   a top wall;
   a bottom wall;
   a right wall;
   a left wall; and
   wherein the top wall, the bottom wall, the right wall and the left wall are configured to inhibit radial movement of the at least one disc out of the recess when the cover is closed.

10. The disc storage container as recited in claim 1, wherein the raised portion further comprises a taper formed substantially around the floor of the recess and configured to facilitate self-centering of a disc being inserted into the recess.

11. The disc storage container as recited in claim 1, wherein the recess is configured to receive a plurality of discs.

12. The disc storage container as recited in claim 1, wherein the recess is configured to receive two discs.

13. The disc storage container as recited in claim 1, wherein the recess is configured to receive three discs.

14. The disc storage container as recited in claim 1, wherein the recess is configured to receive four discs.

15. The disc storage container as recited in claim 1 wherein both the first and the second latch are in the open position.

16. The disc storage container as recited in claim 1, wherein both the first and the second latch are in the closed position.

17. A disc storage container for storing at least one optical disc, the disc storage container comprising:
   a housing having a cover, a base and a living hinge member interconnecting the cover and the base via two living hinges;
   a raised portion of the base defining a recess which is configured to receive at least one optical disc, the recess having a floor and the raised portion comprising:
      a taper formed substantially around the floor of the recess and configured to facilitate self-centering of the at least one optical disc being inserted into the recess;
      a top wall configured to inhibit movement of a disc radially out of the recess;
      a bottom wall configured to inhibit movement of a disc radially out of the recess;
      a right wall configured to inhibit movement of the at least one optical disc radially out of the recess;
      a left wall configured to inhibit movement of the at least one optical disc radially out of the recess;
      a first depression configured to facilitate grasping of the at least one optical disc disposed within the recess formed in the raised portion intermediate the top wall and the right wall;
      a second depression configured to facilitate grasping of the at least one optical disc disposed within the recess formed in the raised portion intermediate the right wall and the bottom wall;
      a cover stop formed to the cover and configured to inhibit removal of the at least one optical disc from the recess when the cover is closed;
      a hinge member stop formed to the hinge member and configured to inhibit removal of the at least one optical disc from the recess when the cover is closed;
      a first latch disposed proximate the top wall, the first latch having an open position and a closed position, wherein removal of the at least one optical disc from the recess is inhibited by the first latch when the first latch is in the closed position and wherein removal of the at least one optical disc from the recess is facilitated by the first latch when the first latch is in the open position;
      a second latch disposed proximate the bottom wall, the second latch having an open position and a closed position, wherein removal of the at least one optical disc from the recess is inhibited by the second latch when the second latch is in the closed position and wherein removal of the at least one optical disc from the recess is facilitated by the second latch when the second latch is in the open position;
      wherein a disc disposed within the recess is removable when only one of the first latch or the second latch is in the open position, thus facilitating both right and left handed operation of the latches.

18. The disc storage container as recited in claim 17, wherein the recess is configured to receive a plurality of discs.

19. The disc storage container as recited in claim 17, wherein both the first latch and the second latch are in the open position.

20. A disc storage container for storing an optical disc, the disc storage container comprising:
   housing means having a cover, a base and a living hinge member interconnecting the cover and the base via two living hinges;
   a raised portion of the base defining a recess which is configured to receive at least one disc, the recess having a floor and the raised portion comprising:
      means for centering a disc formed substantially around the floor of the recess;

a top wall configured to inhibit movement of a disc radially out of the recess;
a bottom wall configured to inhibit movement of a disc radially out of the recess;
a right wall configured to inhibit movement of a disc radially out of the recess;
a left wall configured to inhibit movement of a disc radially out of the recess;
a first depression configured to facilitate grasping of a disc disposed within the recess formed in the raised portion intermediate the top wall and the right wall;
a second depression configured to facilitate grasping of a disc disposed within the recess formed in the raised portion intermediate the right wall and the bottom wall;
means for inhibiting removal of the disc from the recess when the cover is closed formed to the cover;
means for inhibiting removal of the disc from the recess when the cover is closed formed to the hinge member;
a first means for latching a disc within the recess disposed proximate the top wall, the first latch having an open position and a closed position, wherein removal of the disc from the recess is inhibited by the first latch when the first latch is in the closed position and wherein removal of the disc from the recess is facilitated by the first latch when the first latch is in the open position;
a second means for latching a disc within the recess disposed proximate the top wall, the second latch having an open position and a closed position, wherein removal of the disc from the recess is inhibited by the second latch when the second latch is in the closed position and wherein removal of the disc from the recess is facilitated by the second latch when the second latch is in the open position;
wherein a disc disposed within the recess is removable when only one of the first latch or the second latch is in the open position, thus facilitating both right and left handed operation of the latches.

21. The disc storage container as recited in claim 20, wherein both the first latch and the second latch are in the open position.

22. The disc storage container as recited in claim 20, wherein the recess is sufficiently deep to accommodate two or more discs.

23. The disc storage container as recited in claim 20, wherein both the first and the second latch are in the closed position.

* * * * *